(12) United States Patent
Brown

(10) Patent No.: US 8,130,755 B2
(45) Date of Patent: *Mar. 6, 2012

(54) LOAD BALANCING WITH DIRECT TERMINAL RESPONSE

(75) Inventor: Scott K. Brown, Marietta, GA (US)

(73) Assignee: AOL Inc., Dulles, VA (US)

( * ) Notice: Subject to any disclaimer, the term of this patent is extended or adjusted under 35 U.S.C. 154(b) by 533 days.

This patent is subject to a terminal disclaimer.

(21) Appl. No.: 11/761,050

(22) Filed: Jun. 11, 2007

(65) Prior Publication Data

US 2007/0288639 A1 Dec. 13, 2007

Related U.S. Application Data

(63) Continuation of application No. 10/157,909, filed on May 31, 2002, now Pat. No. 7,292,571, which is a continuation-in-part of application No. 09/893,692, filed on Jun. 29, 2001, now Pat. No. 7,266,609, and a continuation-in-part of application No. 10/134,439, filed on Apr. 30, 2002, now Pat. No. 7,124,166, and a continuation-in-part of application No. 10/134,552, filed on Apr. 30, 2002, now Pat. No. 7,430,552.

(60) Provisional application No. 60/373,329, filed on Apr. 18, 2002, provisional application No. 60/286,964, filed on Apr. 30, 2001, provisional application No. 60/343,182, filed on Dec. 31, 2001.

(51) Int. Cl.
*H04L 12/28* (2006.01)
*G06F 15/16* (2006.01)
*G06F 15/173* (2006.01)

(52) U.S. Cl. .......................... 370/389; 709/203; 709/226

(58) Field of Classification Search .................. 709/226, 709/218, 201, 203; 370/312
See application file for complete search history.

(56) References Cited

U.S. PATENT DOCUMENTS

| 4,872,160 A | 10/1989 | Hemmady et al. |
| 5,283,639 A | 2/1994 | Esch et al. |
| 5,493,568 A | 2/1996 | Sampat et al. |
| 5,583,561 A | 12/1996 | Baker et al. |
| 5,600,646 A | 2/1997 | Polomski |

(Continued)

FOREIGN PATENT DOCUMENTS

EP    1 063 814    12/2000

(Continued)

OTHER PUBLICATIONS

Furht, B. et al., "IP Simulcast: A New Technique for Multimedia Broadcasting Over the Internet;" Cit. Journal of Computing and Information Technology, Zagreb, HR, vol. 6, No. 3, Sep. 1, 1998, pp. 245-254, XP000870379, ISSN: 1330-1136, *the whole document*.

(Continued)

*Primary Examiner* — Melanie Jagannathan
(74) *Attorney, Agent, or Firm* — Finnegan, Henderson, Farabow, Garrett & Dunner, LLP

(57) ABSTRACT

Generally, a terminal can access a resource selection device to access a content source, the content source being structured and arranged to respond directly to the terminal. For example, a PC ("personal computer") may be pointed at a load-balancing switch. The load balancing switch translates the PC's traffic and directs the PC traffic to a server (or switch) providing streaming services. The server responds directly to the terminal, but uses the IP address/identity of the load-balancing switch with which the terminal is communicating.

20 Claims, 3 Drawing Sheets

U.S. PATENT DOCUMENTS

| | | | |
|---|---|---|---|
| 5,604,542 | A | 2/1997 | Dedrick |
| 5,689,641 | A | 11/1997 | Ludwig et al. |
| 5,774,660 | A | 6/1998 | Brendel et al. |
| 5,799,002 | A | 8/1998 | Krishman |
| 5,802,301 | A | 9/1998 | Dan et al. |
| 5,809,237 | A | 9/1998 | Watts et al. |
| 5,815,662 | A | 9/1998 | Ong |
| 5,838,912 | A | 11/1998 | Poon et al. |
| 5,841,763 | A | 11/1998 | Leondires et al. |
| 5,867,502 | A | 2/1999 | Chang |
| 5,872,588 | A | 2/1999 | Aras et al. |
| 5,913,062 | A | 6/1999 | Vrvilo et al. |
| 5,935,245 | A | 8/1999 | Sherer |
| 5,946,614 | A | 8/1999 | Robbins et al. |
| 5,973,722 | A | 10/1999 | Wakai et al. |
| 6,011,782 | A | 1/2000 | DeSimone et al. |
| 6,052,805 | A | 4/2000 | Chen et al. |
| 6,061,349 | A | 5/2000 | Coile et al. |
| 6,097,720 | A | 8/2000 | Araujo et al. |
| 6,101,187 | A | 8/2000 | Cukier et al. |
| 6,119,163 | A | 9/2000 | Monteiro et al. |
| 6,141,336 | A | 10/2000 | Bauchot et al. |
| 6,151,621 | A | 11/2000 | Colyer et al. |
| 6,151,632 | A | 11/2000 | Chaddha et al. |
| 6,157,635 | A | 12/2000 | Wang et al. |
| 6,173,314 | B1 | 1/2001 | Kurashima et al. |
| 6,189,039 | B1 | 2/2001 | Harvey et al. |
| 6,195,680 | B1 | 2/2001 | Goldszmidt et al. |
| 6,201,859 | B1 | 3/2001 | Memhard et al. |
| 6,226,686 | B1 | 5/2001 | Rothschild et al. |
| 6,259,701 | B1 | 7/2001 | Shur et al. |
| 6,266,335 | B1 | 7/2001 | Bhaskaran |
| 6,298,129 | B1 | 10/2001 | Culver et al. |
| 6,314,464 | B1 | 11/2001 | Murata et al. |
| 6,327,622 | B1 | 12/2001 | Jindal et al. |
| 6,347,090 | B1 | 2/2002 | Ooms et al. |
| 6,363,075 | B1 | 3/2002 | Huang et al. |
| 6,363,429 | B1 | 3/2002 | Ketcham |
| 6,370,112 | B1 | 4/2002 | Voelker |
| 6,377,996 | B1 | 4/2002 | Lumelsky et al. |
| 6,381,746 | B1 | 4/2002 | Urry |
| 6,389,462 | B1 * | 5/2002 | Cohen et al. ............ 709/218 |
| 6,415,312 | B1 | 7/2002 | Boivie |
| 6,415,323 | B1 | 7/2002 | McCanne et al. |
| 6,418,214 | B1 | 7/2002 | Smythe et al. |
| 6,434,622 | B1 | 8/2002 | Monteiro et al. |
| 6,437,830 | B1 | 8/2002 | Horlander |
| 6,457,043 | B1 | 9/2002 | Kwak et al. |
| 6,466,550 | B1 | 10/2002 | Foster et al. |
| 6,490,285 | B2 | 12/2002 | Lee et al. |
| 6,510,553 | B1 | 1/2003 | Hazra |
| 6,516,350 | B1 | 2/2003 | Lumelsky et al. |
| 6,625,773 | B1 | 9/2003 | Boivie et al. |
| 6,646,997 | B1 | 11/2003 | Baxley et al. |
| 6,665,726 | B1 | 12/2003 | Leighton et al. |
| 6,708,213 | B1 | 3/2004 | Bommaiah et al. |
| 6,711,212 | B1 | 3/2004 | Lin |
| 6,728,356 | B1 | 4/2004 | Carroll |
| 6,728,784 | B1 | 4/2004 | Mattaway |
| 6,751,219 | B1 | 6/2004 | Lipp et al. |
| 6,785,704 | B1 | 8/2004 | McCanne |
| 6,847,618 | B2 | 1/2005 | Laursen et al. |
| 6,873,627 | B1 | 3/2005 | Miller et al. |
| 7,133,922 | B1 | 11/2006 | She et al. |
| 7,237,033 | B2 | 6/2007 | Weigand et al. |
| 7,266,609 | B2 | 9/2007 | Bill et al. |
| 7,292,571 | B2 | 11/2007 | Brown |
| 2002/0024956 | A1 | 2/2002 | Keller-Tuberg |
| 2002/0026482 | A1 | 2/2002 | Morishige et al. |
| 2002/0031126 | A1 | 3/2002 | Crichton et al. |
| 2002/0093963 | A1 | 7/2002 | Roullet et al. |
| 2002/0103863 | A1 | 8/2002 | Pearson |
| 2002/0112004 | A1 | 8/2002 | Reid et al. |
| 2002/0112069 | A1 | 8/2002 | Sim |
| 2002/0114302 | A1 | 8/2002 | McDonald et al. |
| 2002/0116532 | A1 | 8/2002 | Berg |
| 2002/0161847 | A1 | 10/2002 | Weigand et al. |
| 2003/0061278 | A1 * | 3/2003 | Agarwalla et al. ............ 709/203 |
| 2003/0099202 | A1 | 5/2003 | Lear et al. |
| 2003/0126197 | A1 | 7/2003 | Black et al. |
| 2003/0145038 | A1 | 7/2003 | Bin Tariq et al. |
| 2003/0154283 | A1 | 8/2003 | Brown |
| 2004/0025186 | A1 | 2/2004 | Jennings et al. |
| 2005/0010653 | A1 | 1/2005 | McCanne |
| 2006/0248231 | A1 * | 11/2006 | O'Rourke et al. ............ 709/245 |
| 2008/0140851 | A1 | 6/2008 | Weigand et al. |

FOREIGN PATENT DOCUMENTS

| | | |
|---|---|---|
| GB | 2 309 849 | 2/1996 |
| JP | 9270793 | 10/1997 |
| WO | WO 96/38961 | 12/1996 |
| WO | 99/27741 | 6/1999 |
| WO | 00/65775 | 11/2000 |
| WO | 00/65776 | 11/2000 |
| WO | 00/69101 | 11/2000 |

OTHER PUBLICATIONS

ST2 Working Group L. Degrossi & L. Berger et al., "Internet Stream Protocol VCersion 2 (ST2) Protocol Specification—Version ST2+; rfc1819.txt." IETF Standard Internet Engineering Task Force, IETF, CH, Aug. 1, 1995, XP015007606 ISSN: 0000-0003, Chapter 1 *p. 6-p. 19*.

International Search Report dated Jul. 2, 2003 (Appln. No. PCT/US03/12086).

Office Action, U.S. Appl. No. 10/090,727, dated May 10, 2005.

Office Action, U.S. Appl. No. 10/134,552, dated Oct. 11, 2005.

Keller et al., An Active Router Architecture for Multicast Video Distribution, St. Louis, Missouri.

Lockwood et al., Reprogrammable Network Packet Processing on the Field Programmable Port Extender (FPX), 2001, St. Louis, Missouri.

Taylor et al., Dynamic Hardware Plugins (DHP): Exploiting Reconfigurable Hardware for High-Performance Programmable Routers, 2002, St. Louis, Missouri.

Choi et al., Design of a Flexible Open Platform for High Performance Active Networks, 1999, St. Louis, Missouri.

PCT International Search Report, for International Application PCT/US02/13362, Apr. 8, 2003, 6 pages.

International Preliminary Examination Report (IPER), dated Feb. 24, 2004, Appln. No. PCT/US02/13362.

Office Action for Japanese Application No. 2002-586120 dated Oct. 10, 2008, 1 page.

European Office Action issued in EP02734066.0 on Apr. 16, 2009, 6 pages.

Supplemental European Search Report issued in EP02734066.0 on Jul. 31, 2006.

European Office Action issued in EP02725839.1 on Apr. 16, 2009, 5 pages.

Indian Office Action issued in 1764/DELNP/2003 on Apr. 16, 2008.

U.S. Office Action issued in U.S. Appl. No. 10/090,727, filed Oct. 11, 2005, 15 pages.

U.S. Office Action issued in U.S. Appl. No. 10/157,909, filed Aug. 9, 2006, 13 pages.

Chinese Office Action issued in 02810728.4 on Jun. 23, 2006.

Chinese Office Action issued in 02810728.4 on Jul. 13, 2007.

Chinese Office Action issued in 02810728.4 on Feb. 29, 2008.

Australian Office Action issued on 200205256 on Feb. 9, 2007.

Australian Office Action issued on 200205256 on May 26, 2008.

Office Action for U.S. Appl. No. 11/754,661, mailed Jun. 19, 2009, 8 pages.

Office Action for Japanese Application No. 2002-586120 dated Apr. 10, 2008, 1 page.

Miyazaki, S., et al., "Stream Transmission Control Application Program Interface," *Technical Report of IEICE*, vol. 100, No. 672, pp. 341-346, in Japanese with English-language Abstract and an English-language excerpt, 11 pages total.

* cited by examiner

LOAD BALANCING WITH DIRECT TERMINAL RESPONSE

CROSS REFERENCE TO RELATED APPLICATIONS

This application is a continuation of U.S. patent application Ser. No. 10/157,909, filed May 31, 2002, now allowed, which claims benefit of Provisional Application Ser. No. 60/373,392, filed Apr. 18, 2002; U.S. patent application Ser. No. 10/157,909 is a Continuation-in-Part of U.S. patent application Ser. No. 09/893,692, filed Jun. 29, 2001, which claims benefit of Provisional Application No. 60/286,964, filed Apr. 30, 2001; U.S. patent application Ser. No. 10/157,909 is a CIP of U.S. patent application Ser. No. 10/134,439, filed Apr. 30, 2002, which claims benefit of Provisional Application No. 60/343,182, filed Dec. 31, 2001; and U.S. patent application Ser. No. 10/157,909 is also a Continuation-in-Part of U.S. patent application Ser. No. 10/134,552, filed Apr. 30, 2002. The disclosures of the prior applications are incorporated herein in their entirety by reference.

TECHNICAL FIELD

This invention relates to network address translation and load balancing.

BACKGROUND

Load balancing enables service providers to create resilient content sources. For example, by using a load-balanced array of servers, an interruption in one of the servers might only affect a subset of users accessing the content sources.

SUMMARY

In general, content sources may be load balanced on a resource selection device by receiving a first packet from a first device with a source IP address of the first device and a destination IP address corresponding to a virtual resource address for a resource selection device, half network address translating the first packet into a translated packet with a destination IP address corresponding to a source IP address related to a content source and a source IP address corresponding to the source IP address of the first device, and transmitting the translated packet to the content source with the appearance of origination from the first device so that the content source may respond to the translated packet with a response packet that has a destination IP address of the first device and a source IP address of the resource selection device.

Implementations may include one or more of the following features. For example, one of several content sources may be selected to receive the translated packet. Selecting one of several content sources may include finding the content source that is closest to the first device. Finding the content source closest to the first device may be done based on a proximity of a domain name server for the first device to the content source. Proximity may be measured based on logical distance.

The content sources may be on different IP broadcast domains.

The resource selection device may include a switch. The content source may include a duplicating switch structured and arranged to enable access to one or more streams of datagrams. The first device may include a terminal. Transmission of the response packet may not require intervention of the resource selection device.

In another general aspect, access to a content source may be provided by receiving a first packet from a first device sent through a resource selection device, the resource selection device having translated a destination address of the first packet from the IP address of the resource selection device to the IP address of the content source while having preserved the source address of the first packet as an IP address of the first device from which the first packet was received. Response packets are assembled and transmitted. The response packets include information pertaining to information in the first packet, a source IP address corresponding to the IP address of the resource selection device, and a destination IP address corresponding to the IP address of the first device.

Implementations may include on or more of the following features. For example, one of several content sources may be selected to receive the translated packet. Selecting one of several content sources may include finding the content source that is closest to the first device. Finding the content source closest to the first device may be done based on a proximity of a domain name server for the first device to the content source. Proximity may be measured based on logical distance. Content sources may be on different IP broadcast domains. The resource selection device may include a switch. The content source may include a duplicating switch structured and arranged to enable access to one or more streams of datagrams. The first device may include a terminal. Transmission of the response packet may not require intervention of the resource selection device.

Other features will be apparent from the following description, including the drawings, and the claims.

DESCRIPTION OF DRAWINGS

Like reference symbols in the various drawings indicate like elements.

DETAILED DESCRIPTION

Generally, a terminal uses a resource selection device to access a content source that is structured and arranged to respond directly to the terminal. For example, a PC ("personal computer") may communicate with a load-balancing switch to retrieve content. The load-balancing switch translates transmissions from the PC and directs the translated transmissions to a server (or switch) that provides streaming services. The server responds directly to the PC, but uses the IP address/identity of the load-balancing switch as the source address in the response.

Figure 1:
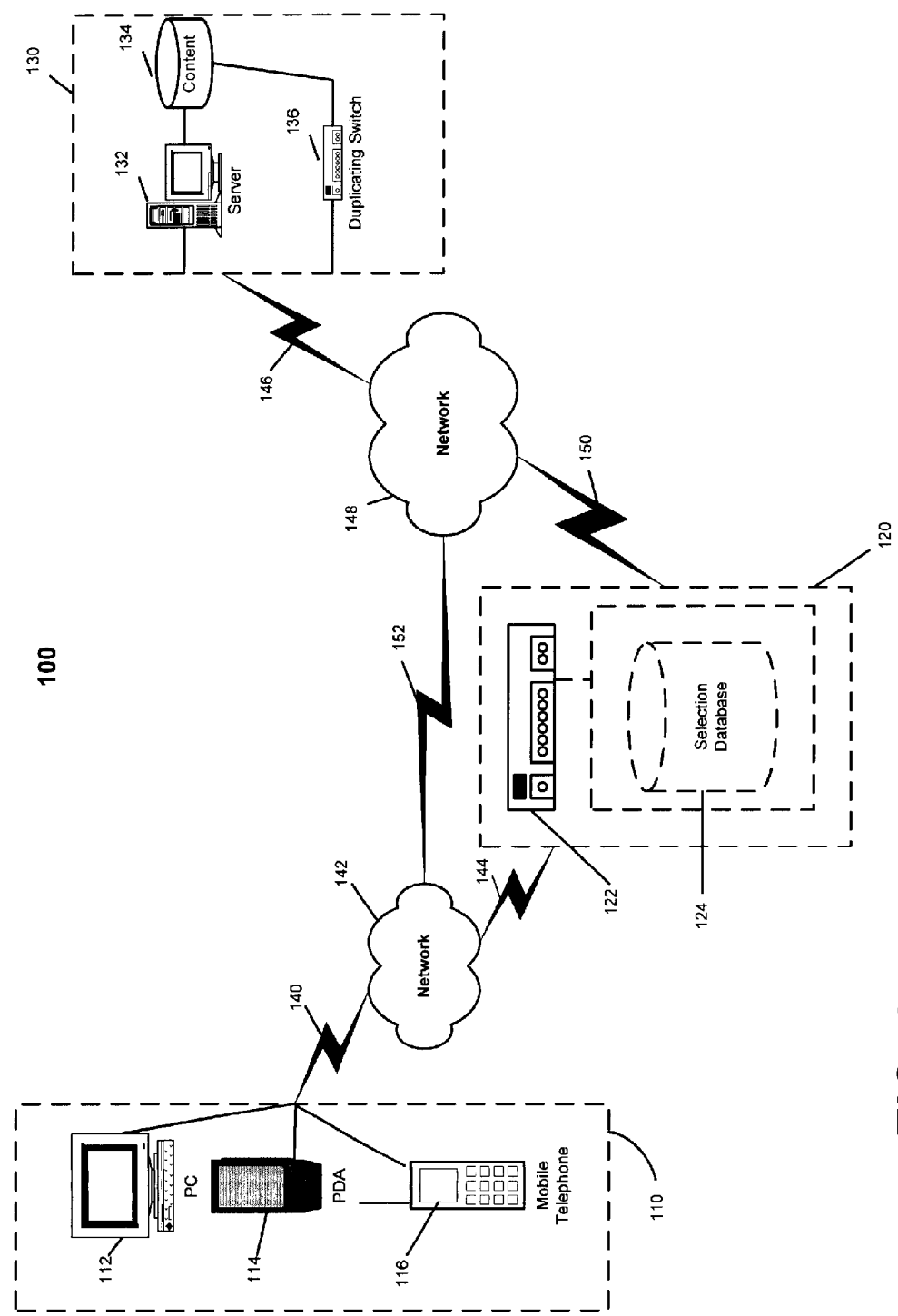
FIG. 1 is a diagram of a networking system structured and arranged to enable a terminal to access a content source through a resource selection device using load balancing techniques.

FIG. 1 illustrates a networking system 100 structured and arranged to enable a terminal 110 to use a resource selection device 120 (e.g., a load balancing switch) to access a content source 130. The terminal 110 communicates with the resource selection device 120 through a communications link 140 that is connected to a network 142 to which the resource selection device is connected by a communications link 144. The content source 130 communicates with the resource selection device 120 through a communications link 146 that is connected to a network 148 through a communications link 150. A communications link 152 connects the network 142 to the network 148.

Typically, the terminal 110 includes one or more devices capable of requesting and receiving content. In particular, the terminal 110 includes one or more devices capable of receiving a stream of data units transmitted by a duplicating switch 132 of the content source 130. The terminal 110 may include a controller (not shown) that processes instructions received from or generated by a software application, a program, a piece of code, a device, a computer, a computer system, or a combination thereof, which independently or collectively direct operations of the terminal 110. The instructions may be embodied permanently or temporarily in any type of machine, component, equipment, storage medium, or propagated signal that is capable of being delivered to the terminal 110 or that may reside with the controller at terminal 110. Terminal 110 may include a general-purpose computer (e.g., a personal computer) capable of responding to and executing instructions in a defined manner, a workstation 112, a notebook (not shown), a PDA ("Personal Digital Assistant") 114, a wireless phone 116, a component, other equipment, or some combination of these items that is capable of responding to and executing instructions.

In one implementation, the terminal 110 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, terminal 110 may include a wireless telephone running a micro-browser application on a reduced operating system with general purpose and specialized hardware capable of operating in mobile environments.

The communications link 140 is used to communicate data between terminal 110 and network 142. Communications link 140 may include, for example, a telephone line, a wireless network link, a cable network, or a direct connection, as may the communications links 144, 146, 150 and 152.

The network 142 typically includes hardware and/or software capable of enabling direct or indirect communications between the terminal 110 and the resource selection device 120. The network 142 may include a direct link between the terminal 110 and the resource selection device 120, or it may include one or networks or subnetworks between them (not explicitly shown). Each network or subnetwork may include, for example, a wired or wireless data pathway capable of carrying and receiving data. Examples of network 142 include the Internet, the World Wide Web, a WAN ("Wide Area Network"), a LAN ("Local Area Network"), an analog or a digital wired and/or wireless telephone network (e.g., PSTN ("Public Switched Telephone Network"), ISDN ("Integrated Services Digital Network"), or xDSL ("any form of Digital Subscriber Loop")), a radio, television, cable, or satellite network, or any other delivery mechanism for carrying data.

Typically, the resource selection device 120 is structured and arranged to enable the terminal 110 to access the content source 130. For example, the resource selection device 120 may receive an IP packet and route the packet to the content source 130. To this end, the resource selection device 120 includes a switch 122 and a selection database 124 that stores information about terminals 110 and content sources 130. Other implementations of the resource selection device 120 may include only the switch 122.

The resource selection device 120 may include logic to monitor the state of the connections through the resource selection device 120. For example, the resource selection device 120 may look at one or more higher layers of protocols in the OSI ("Open Systems Internconnect") to determine the state of one or more content sources 130. The state information then may be used to determine the content source 130 to which the terminal 110 may be directed.

Typically, the resource selection device 120 includes logic structured and arranged to perform address translation. Address translation involves receiving an IP ("Internet Protocol") packet of addressing information, and mapping that address information to a new set of address information. Address translation, which also may be referred to as NAT ("Network Address Translation"), may be performed in a variety of contexts. For example, NAT may be used to "hide" internal addressing information to prevent external systems from learning of an internal configuration. In this manner, additional addressing space can be created using NAT on the edges of the network.

Full NAT refers to NAT whereby the translation is performed on both the source address and the destination address at layer 3. In this manner, a resource selection device 120 performing full NAT appears as the source for all devices with which the resource selection device 120 is communicating.

Half NAT refers to the logic whereby only some of the addressing information is changed. For example, a resource selection device 120 may change the destination address in a received IP packet from the IP address of the resource selection device to the IP address of the content source 130. In this manner, the content source 130 may learn the IP address of the terminal 110, whereas if the resource selection device performed full NAT, the content source 130 would require extra measures to learn the IP address of the terminal. These extra measures might require establishing out-of-band communications to transmit the addressing information of the terminal. Without the address of the terminal 110, the content source 130 may not respond using packets directed to the IP address of the terminal.

Although the resource selection device 120 typically includes a switch, the resource selection device 120 may include other devices capable of acting as resource selection devices. These other devices may include servers, workstations, routers, and gateways.

Although the resource selection device 120 is shown as a separate and distinct device, the resource selection device 120 may be combined with other devices. For example, a cable headend or access point (e.g., a wireless base station or a modem bank) may include one or more components (software, hardware, or both) so that the headend or access point includes a resource selection device 120.

The resource selection device 120 typically includes logic that enables the resource selection device 120 to select a content source 130 from among several content sources for load balancing. Although selecting one of several content sources typically is referred to as load balancing, the selection process more aptly is termed "intelligent selection." That is, in deciding to "host" ten terminals between an east coast content source and a west coast content source, if seven of the terminals reside on the east coast, then seven of the terminals might be directed to the east coast content source, while the remaining three terminals are directed to the west coast content source. While this may not balance the number of connections with the respective content sources, it does serve to minimize the bandwidth consumed across the network. This may result in lower circuit costs, a better user experience (fewer dropped frames and/or interruptions), and/or less equipment requirements.

Other techniques may be used to select the content source. For example, the connections may be round-robin assigned. Other examples include utilization-based selection (identifying the network connection that is least utilized) and/or state based selection (based on looking at the traffic and packet flow, user profile, and/or the state of the content source).

As noted above, the selection algorithm may include using location-weighted criteria. For example, a user's zip code may be analyzed to determine location information. This location information then may be correlated with a content source (in advance, or as needed). In response, the resource selection device 120 may direct traffic from that user to the correlated content source.

Although location selection has been described in association with a user's location, location selection criteria may include determining location criteria relative to existing content sources and circuits. For example, the resource selection device 120 may receive a request from a user in Minnesota. The resource selection device may determine that although content sources are not presently available in Minnesota, a duplicating switch capable of acting as a content source resides nearby, either in Minnesota or elsewhere. The resource selection device 120 may interface with the identified content source, configure it to act as a content source for the requesting device, and then direct the requesting device to the newly-established content source.

The network 148 may include hardware and/or software capable of enabling direct or indirect communications between the content source 130 and the resource selection device 120. As such, the network 148 may include a direct link between the resource selection device 120 and the content source 130, or it may include one or more networks or subnetworks between them (not shown). Each network or subnetwork may include, for example, a wired or wireless data pathway capable of carrying and receiving data. Examples of the delivery network include the examples noted above with respect to network 142. Network 142 and network 148 may share one or more hardware or software devices.

The content source 130 includes a system structured and arranged to make content available to one or more terminals. Examples of the content source 130 may include duplicating switches, servers (e.g., a web server) and/or other computing devices. Generally, the content source 130 is structured and arranged to be able to receive a packet (e.g., a data request for a stream or a web page) sent from a resource selection device 120, the packet having undergone half-NAT processing so that the packet includes an IP destination address of the content source 130 and the source address of the terminal 110.

Typically, a content source 130 may be structured and arranged to convert a media source (e.g., a video or audio feed) into data units for transmission across networks 142 and 148. The content source 130 may include a general-purpose computer having a central processor unit (CPU), and memory/storage devices that store data and various programs such as an operating system and one or more application programs. Other examples of a content source 130 include a workstation, a server, a special purpose device or component, a broadcast system, other equipment, or some combination thereof capable of responding to and executing instructions in a defined manner. The content source 130 also typically includes an input/output (I/O) device (e.g., video and audio input and conversion capability) and peripheral equipment such as a communications card or device (e.g., a modem or a network adapter) for exchanging data with the network The content source 130 includes a server 132, a content database 134 and a duplicating switch 136. Other implementations of the content source 130 may include less than all of these elements. For example, other implementations may not include the server 132 or the duplicating switch 136.

The duplicating switch 136 typically is structured and arranged to receive the stream of data units from a content database 134, to duplicate the stream of data units, and to transmit a stream of duplicated data units to one or more terminals 110. In some implementations, the duplicating switch is structured and arranged to perform filtering and forwarding between different domains at the same level of the protocol stack in the OSI ("Open System Interconnection") reference model. For example, a switch may forward Ethernet frames between different Ethernet segments. In another example, the switch may forward IP packets between different IP subnets.

In general, a duplicating switch includes a device that performs network operations and functions in hardware (e.g., in a chip or part of a chip). In some implementations, the device may include an ASIC ("Application Specific Integrated Circuit") implementing network operations logic directly on a chip (e.g., logical gates fabricated on a silicon wafer and then manufactured into a chip). For example, an ASIC chip may implement in silicon a logical gate structure to perform filtering by receiving a packet, examining the IP address of the received packet, and filtering based on the IP address.

An implementation of the device included in the duplicating switch may include a Field Programmable Gate Array (FPGA). A FPGA is generally defined as including a chip or chips fabricated to allow a third party designer to implement a variety of logical designs on the chip. For example, a third party designer may load a FPGA with a design that replaces the received IP addresses with different IP addresses, or with a design that segments and reassembles IP packets as they are modified while being transmitted through different networks.

An implementation of the device included in the duplicating switch also may include a network processor. A network processor is generally defined to include a chip or chips for allowing software to specify network operations to be performed. A network processor may perform a variety of operations. One example of a network processor may include several interconnected RISC ("Reduced Instruction Set Computer") processors fabricated in a single network processor chip. The network processor chip may implement software to change an IP address of an IP packet on some of the RISC processors. Other RISC processors of the network processor chip may implement software that maintains a record of which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

Data units handled by the duplicating switch may be accessed by or sent to terminals 110 through network 148. As such, network 148 is structured and arranged to receive data units transmitted from the duplicating switch for transmission to the terminals 110.

Both the resource selection device 120 and the content source 130 may be structured and arranged to include using virtual IP addresses. For example, the management console of a duplicating switch may reside at a first IP address. However, a second virtual IP address may be created on the duplicating switch. The duplicating switch may be configured to know that requests received on the second virtual IP address are associated with a specified resource selection device. Thus, a particular content source may have several virtual IP addresses, possibly even on the same physical interface. In this manner, a content source may support multiple resource selection devices.

Figure 2:
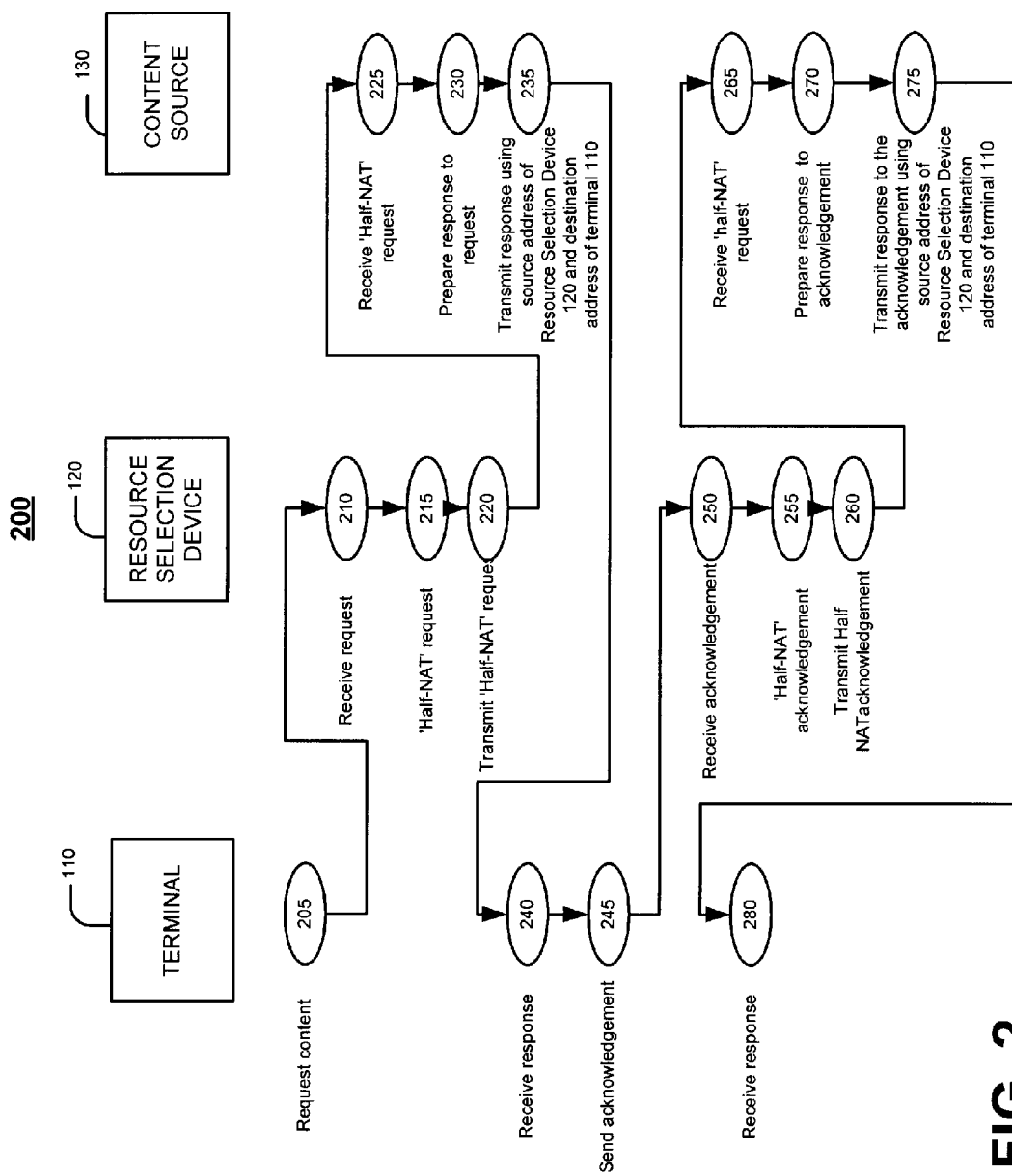
FIG. 2 is a flow chart showing how a terminal may be load-balanced so that the content source may directly respond to the terminal.

FIG. 2 provides a flow chart 200 that shows how a resource selection device 120 may implement load balancing such that the content source 130 may respond directly to the terminal 110. In particular, FIG. 2 illustrates a handshaking process that includes a request, a response, an acknowledgement, and an acknowledgment response. TCP ("Transport Control Protocol") is one example of a protocol that may use handshaking. The direct terminal response from the content source 130 to the terminal 110 refers to the fact that the content source 130 does not need the resource selection device 120 to perform address translation for communications from the content source 130 to the terminal 110. The direct terminal response does not require the terminal 110 to be directly connected to the content source 130. In fact, typically there may be one or more intervening elements (e.g., networks 142 and 148) between the content source 130 and the terminal 110.

Although not shown in FIG. 2, the terminal 110 will learn the identity of a resource selection device 120 from which to request content. For example, a PC may request an IP address from a domain name server for a web server. The domain name server may return an IP address for one of several resource selection devices.

Initially, terminal 110 requests content (step 205). The request may include a request for a web page or a streaming media. Resource selection device 120 receives the request (step 210). In a step that is not shown, the resource selection device identifies a content source 130. Identifying the content source may be performed independent of receiving the request. For example, the resource selection device 120 may have one or more content sources statically mapped to a round robin assignment system. In another example, the resource selection device 120 may employ the selection database 124 to map IP addresses to content sources 130. The selection database 124 may reside on the resource selection device 120, or it may reside on a separate device.

Alternatively, the resource selection device 120 may identify a content source 130 response to receiving the request. The resource selection device 120 may access state controllers that provide information descriptive of the circuits and/or systems that might be used to respond to the request. For example, the resource selection device 120 may monitor layer-4 protocol information to gauge the state of the server 132 (or switch 136), and the ability of the server 132 to support additional connections.

The resource selection device 120 may interface with a location code segment to determine the content source that is the closest to the terminal. Closeness may be measured by logical distance (e.g., link count) or by the proximity of the terminal's domain name server.

In any event, a content source 130 is identified. The resource selection device 120 performs a half NAT on the request to the content source (step 215). Performing the half NAT on the request involves changing the destination address from the address of the resource selection device 120 to the address of the content source 130. After the half-NAT is performed, the request is transmitted to the content source 130 (step 220), which receives the request (step 225).

The content source 130 may be in a different IP broadcast domain than the resource selection device. That is, there may be one or more layer three routing devices (e.g., filtering layer 2 broadcasts) between the broadcast domains of the resource selection device and the content source.

Content source 130 then prepares the response to the request (step 230). For example, if the request is for a web page, the content source may retrieve the requested data and prepare the web page for transmission to the terminal 110. If the request is for a media stream, the content source 130 prepares the media stream for transmission to the terminal 110. For example, if the content source 130 is a duplicating switch that enables access to a media stream, the content source 130 may dynamically access the stream in response to receiving the request. That is, if a duplicating switch is not receiving the stream, the duplicating switch may "pull" the stream to enable the terminal 110 to access the stream. If the duplicating switch is already transmitting the stream to other terminals 110, the duplicating switch may add the address of the requesting terminal 110 to the list of stream recipients.

In any event, regardless of the nature of the content source 130, the content source 130 transmits the response to the terminal 110 using the address of the terminal 110 as the destination address and the address of the resource selection device 120 as the source address (step 235). The content source 130 may learn what source address to use on packets being sent to the terminal 110 by analyzing the address on which the content source received the request. That is, if a request is received on Virtual IP Y.Y.Y.1, the content source 130 is configured to use the IP address of resource selection device#1 (e.g., X.X.X.1) as the source address, while a request received on Virtual IP Y.Y.Y.2 uses the source IP address of resource selection device #2 (e.g., X.X.X.2). In this example, the resource selection device may select between devices in different layer three IP broadcast domains, where X and Y indicate different IP networks.

The terminal 110 receives the response (step 240). Depending on the nature of the application and the protocol, subsequent traffic may be received directly from the content source without requiring additional transmissions from the terminal 110. However, some protocols and applications use "keep-alive messages" and "acknowledgements." Aspects of this are represented with respect to steps 245-280.

For example, the terminal 110 may send an acknowledgement (step 245). The resource selection device receives the acknowledgement (step 250). The resource selection device 120 half-NATs the acknowledgement (step 255) and transmits it (step 260). The acknowledgement is received by the content source 130 (step 265) which prepares the response to the acknowledgement (step 270). In one instance, the content desired by the terminal 110 may not be transmitted until the acknowledgement is received, using the response to the request (steps 230-235) as part of the handshaking process. The content source 130 transmits a response to the acknowledgement using the source address of the resource selection device and the destination address of the terminal 110 (step 275). Terminal 110 receives the response (step 280).

Figure 3:
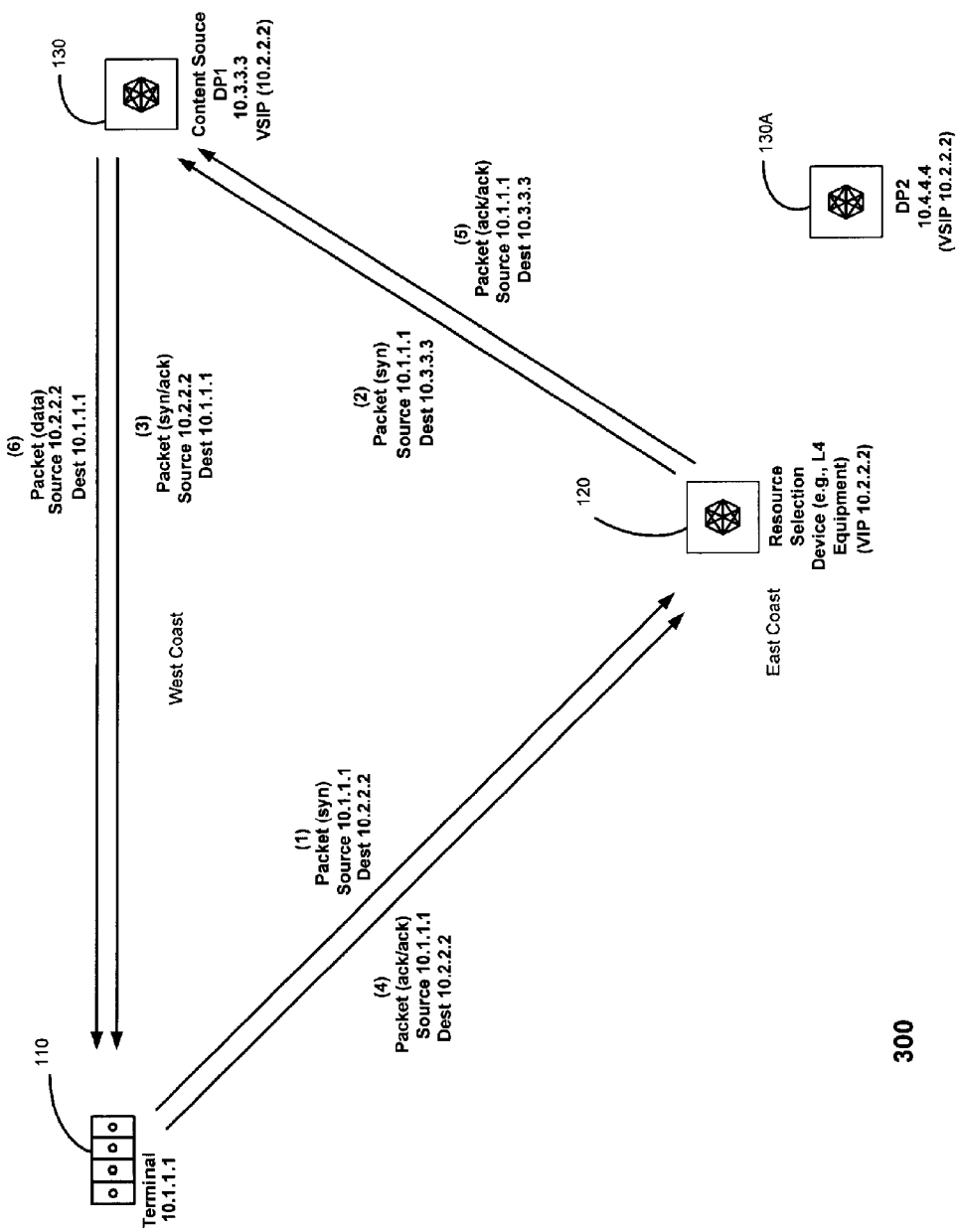
FIG. 3 is a block diagram illustrating how IP addressing information changes in a networking system that load balances with a direct terminal response from the content source.

FIG. 3 shows a terminal 110 interfacing with a resource selection device 120 to access a content source 130. In particular, FIG. 3 shows how a TCP ("Transport Control Protocol") connection may be established using half-NAT translation on the resource selection device 120 to modify the requests and responses, including the SYN (synchronization request) and ACK (acknowledgement) signals. Although TCP is a connection-oriented protocol, other protocols can use the translating scheme shown in FIG. 3. For example, a UDP ("User Datagram Protocol") transmission could be exchanged between the terminal 110 and the content source 130 using the same half NAT shown in FIG. 3. The difference is that UDP typically does not involve the handshaking process involved with TCP, although higher protocol layers may include aspects of the handshaking.

Initially, a terminal 110, with an IP address of 10.1.1.1 sends SYN packet (1) with source address information of 10.1.1.1 and destination address information of 10.2.2.2. The resource selection device 120 half network address translates the packet, and sends packet (2) with source address information of 10.1.1.1.1. and a destination address information of 10.3.3.3. Content source 130, with an IP address of 10.3.3.3, receives packet (2) and sends packet (3) with a source IP address of the resource selection device 120 (10.2.2.2) (rather than itself) and a destination IP address of 10.1.1.1 (the terminal 110). The terminal 110 sends an acknowledgement request in packet (4), with a source address of 10.1.1.1 and a destination address of 10.2.2.2 to the resource selection device 120. The resource selection device 120 half network address translates the ACK and sends packet (5) to the content source 130 with a source address of the terminal 110 (10.1.1.1) and the destination address of the content source 130 (10.3.3.3). The content source 130 receives the packet (5), retrieves the data (not shown), and sends a packet (6) with the data to the terminal 110 with a source address of the resource selection device 130 (10.2.2.2) (rather than itself) and a destination address of the terminal 110 (10.1.1.1). Although this example of a subnetwork (10.*.*.*) involves the use of private addressing space, the use of this address space was exemplary and represents no limitation. Other network addresses and address ranges may be used.

Other implementations are within the scope of the following claims. For instance, a stream manager may dynamically create and remove content sources. The stream manager may include a network operator, a managing server, a workstation, or a scheduling agent.

What is claimed is:

1. A load balancing device comprising:
   a first communications interface structured and arranged to receive a first packet from a first device, the first packet having a source IP address of the first device and a destination IP address corresponding to the load balancing device;
   a stream manager structured and arranged to:
      identify that the first packet from the first device includes a request to receive a particular stream of information;
      identify a content source to support the request, wherein the content source is not hosting the particular stream of information as the request is received on the first communications interface; and
      dynamically instruct the content source to host the particular stream of information as a result of identifying that the first packet from the first device includes the request to receive the particular stream of information;
   a first switching processor structured and arranged to half network address translate the first packet into a translated packet having a destination IP address corresponding to a source IP address related to a content source and a source IP address corresponding to the source IP address of the first device; and
   a second communications interface structured and arranged to transmit the translated packet to the content source with the appearance of origination from the first device so that the content source may respond to the translated packet with a response packet that has a destination IP address of the first device and a source IP address of the load balancing device.

2. The load balancing device of claim 1, wherein the content source comprises a plurality of datagrams.

3. The load balancing device of claim 1, wherein the second communications interface is structured and arranged to transmit the translated packet to the content source with the appearance of origination from the first device so that the content source may respond directly to the first device without further processing by the load balancing device.

4. The load balancing device of claim 1, wherein the stream manager is structured and arranged to identify one content source from a plurality of content sources to support the request.

5. The load balancing device of claim 4, wherein the identification is based on at least the physical distance between the first device and the identified content source.

6. The load balancing device of claim 4, wherein the identification is based on at least the logical distance between the first device and the identified content source.

7. The load balancing device of claim 4, wherein the identification is based on at least location-weighted criteria regarding at least the first device.

8. The load balancing device of claim 1, wherein the request is a request for streaming content hosted by the content source.

9. The load balancing device of claim 1, wherein the first communications interface is structured and arranged to receive the first packet from the first device, the first packet having a source IP address of the first device and a destination IP address corresponding to a virtual resource address for the load balancing device.

10. The load balancing device of claim 1, wherein the first switching processor is structured and arranged to half network address translate the first packet into a translated packet having a destination IP address corresponding to a virtual source IP address related to a content source and a source IP address corresponding to the source IP address of the first device.

11. A content delivery system comprising:
    a plurality of content source devices; and
    a load balancing device, the load balancing device comprising:
       a first interface structured and arranged to receive a packet from a client device, the packet having a source IP address of the client device and a destination IP address corresponding to the load balancing device;
       a stream manager structured and arranged to:
          identify that the packet from the client device includes a request to receive a particular stream of information;
          identify a content source device from the plurality of content source devices to support the request; and
          instruct the content source device to host the particular stream of information;
       a switching processor structured and arranged to half network address translate the packet into a translated packet having a destination IP address corresponding to the identified content source device and a source IP address corresponding to the source IP address of the client device; and
       a second interface structured and arranged to transmit the translated packet to the content source device with the appearance of origination from the client device so that the content source device may directly respond to the client device with the particular stream of information.

12. The content delivery system of claim 11, wherein the plurality of content source devices comprise a plurality of datagrams.

13. The content delivery system of claim 11, wherein the plurality of content source devices comprise one or more content servers, one or more content databases storing a plurality of datagrams, and one or more duplicating switches.

14. The content delivery system of claim 11, wherein the identification of the content source device is based on at least the physical distance between the client device and the identified content source device.

15. The content delivery system of claim 11, wherein the identification of the content source device is based on at least the logical distance between the client device and the identified content source device.

16. The content delivery system of claim 11, wherein the identification of the content source is based on at least location-weighted criteria regarding at least the client device.

17. The content delivery system of claim 11, wherein the identification of the content source is based on at least the proximity of a domain name server to the client device.

18. The content delivery system of claim 11, wherein the request is a request for streaming content hosted by the content source device.

19. The content delivery system of claim 11, wherein the first interface is structured and arranged to receive a packet from a client device, the packet having a source IP address of the client device and a destination IP address corresponding to a virtual resource address for the load balancing device.

20. The content delivery system of claim 11, wherein the switching processor is structured and arranged to half network address translate the packet into a translated packet having a destination IP address corresponding to a virtual source IP address related to the identified content source device and a source IP address corresponding to the source IP address of the client device.

* * * * *